Nov. 19, 1968 R. E. FISHER 3,411,436
BALE CHUTE DAMPENER
Filed Jan. 4, 1967
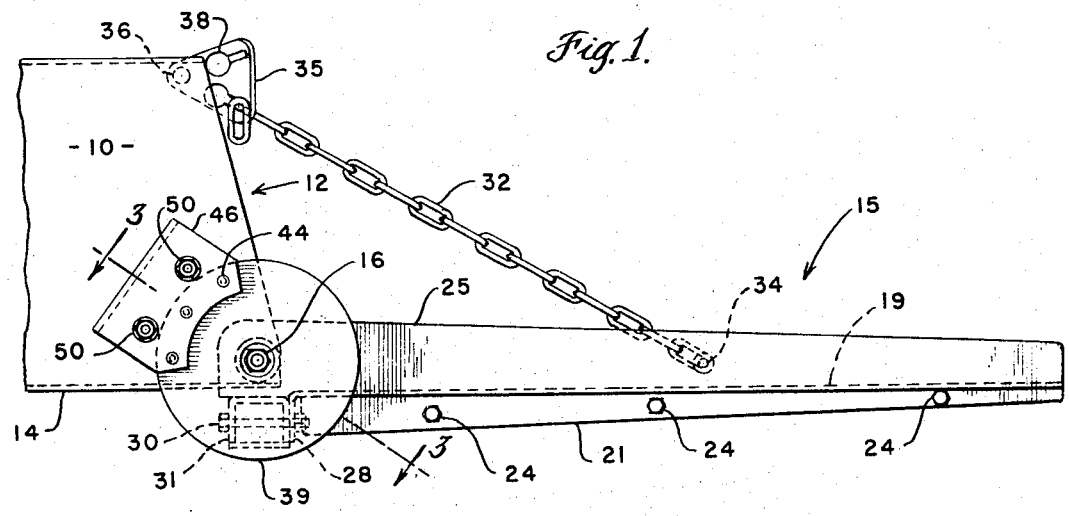
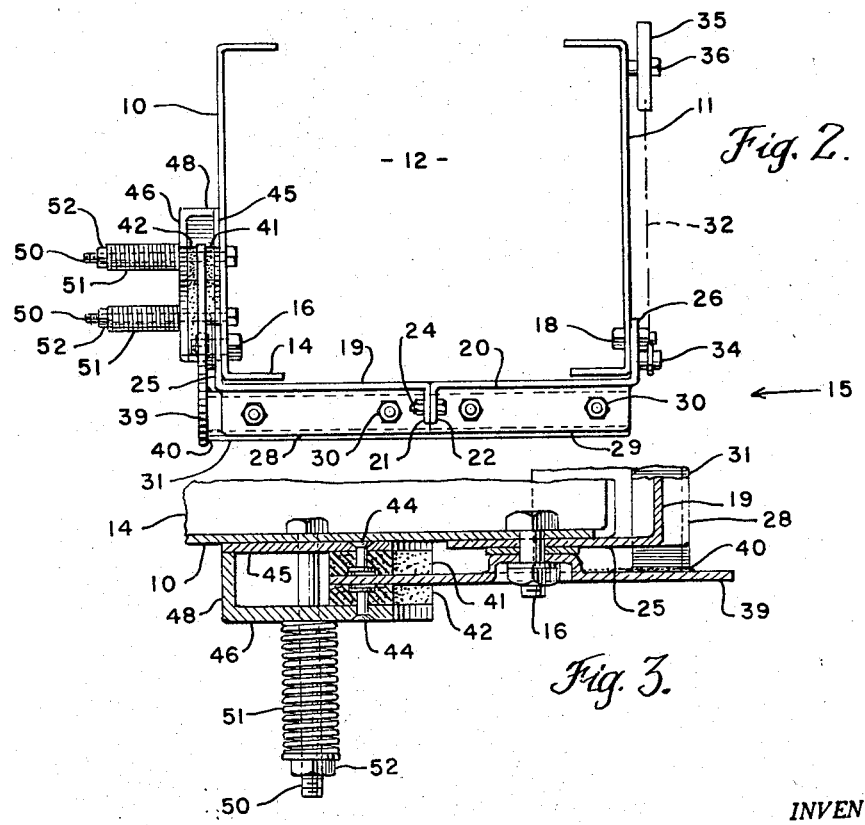
INVENTOR.
RAYMOND E. FISHER
BY *Walter V. Wright*
AGENT

United States Patent Office 3,411,436
Patented Nov. 19, 1968

3,411,436
BALE CHUTE DAMPENER
Raymond E. Fisher, New Holland, Pa., assignor to Sperry Rand Corporation, New Holland, Pa., a corporation of Delaware
Filed Jan. 4, 1967, Ser. No. 607,226
5 Claims. (Cl. 100—188)

ABSTRACT OF THE DISCLOSURE

A hay baler bale chute including a friction brake to prevent self-destructive bouncing of the chute relative to a hay baler on which it is mounted.

Background of the invention

Hay balers conventionally utilize a bale chute at the discharge end of the bale case to support the weight of completed bales until they have fully emerged from the bale case. Without such chutes, bales emerging from the bale case would bend toward the ground under their own weight before they were completely free of the bale case. This would result in crooked or broken bales. The bale chutes have a generally horizontal operative position, but are usually mounted on the bale case for vertical pivotal movement to a substantial vertical transport position to reduce the total overhang of the machine for transport. The discharge end of the bale case is at the extreme rear of the baler, a considerable distance behind the supporting wheels.

As is well known in the hay baler art, bales are formed in the bale case of a hay baler by a reciprocating plunger of considerable mass. This, along with the other moving components of the baler, subjects the entire machine to loads of a rhythmic pulsating nature which causes the bale chute to bounce relative to the bale case on which it is mounted. Each bale is advanced out of the bale case and onto the chute by the successively emerging bales. When a bale is free of the bale case, it falls off the chute onto the ground. A brace, usually in the form of a chain extending between the bale chute and the bale case, provides a fixed bottom stop for the chute in the horizontal operative position and provides support for the bale chute and the weight of the bales thereon. The bouncing of the bale chute subjects the chute mounting points and the brace connecting points to severe impact load conditions which causes the bale chute to fail structurally after only a relatively short service life.

The chain brace is commonly utilized to hold the chute in the vertical position during idle transport. This reduces the bouncing of the chute during transport, but creates an additional annoyance for the operator. When rehooking the chute to its operative position after transport, the operator must hunt for the correct link of the brace chain which will reestablish proper operating position of the chute. It is not uncommon for an operator to forget that a chute is chained in transport position and begin baling with the chute chained in the vertical transport position. This results in excessive damage to the chute.

Summary of the invention

The present invention combines with the usual bale chute structure, an inexpensive friction brake device which holds the chute in any position to which it is manually moved. This eliminates bouncing of the chute thereby eliminating impact loads on the chute mounting members and greatly increasing the useful service life of the chute. When moving the chute from operative to transport position, the operator is no longer required to relatch the brace chain to maintain the chute in transport position. The transport position is maintained automatically by the friction brake device. Should the operator forget to reset the chute from transport to operative position when he begins bailing, the first bale to emerge from the bale case pivots the chute from the vertical transport position without damage to the chute.

Brief description of the drawings

FIG. 1 is a fragmentary elevational view of the discharge end of a hay baler bale case and bale chute equipped with a friction dampener device constructed in accordance with the principles of the present invention;

FIG. 2 is an end view of the structure shown in FIG. 1 looking from right to left in FIG. 1; and FIG. 3 is a sectional view, to an enlarged scale, taken on the line 3—3 of FIG. 1.

Description of the preferred embodiment

The reference numerals 10 and 11 indicate the side walls of a hay baler bale case having the usual rear discharge opening 12. The plane of the horizontal bottom of the bale case is indicated by the reference numeral 14. A bale chute 15 is pivotally attached to the side walls of the bale case by pivot bolts 16 and 18.

The bale chute 15 is preferably made of two elongated bale supporting plates 19 and 20 as may be seen in FIG. 2. The plates abut each other along a vertical plane substantially in the center of the bale case and are provided with downturned flanges 21 and 22 along the line of abutment. A plurality of bolts 24 connect the downturned flanges 21 and 22 together. Adjacent the side walls 10 and 11 of the bale case, the chute plates 19 and 20 are provided with upturned flanges 25 and 26 which receive the mounting bolts 16 and 18.

At the forward ends of the bale chute plates 19 and 20, downturned flanges 28 and 29 are attached by bolts 30 to a cross frame member 31 of box cross sectional configuration. With this construction it is possible to replace half the bale chute while retaining the other half. It is also possible to remove the plate 19, for example, thereby converting the bale chute into a quarter turn bale chute wherein the rearwardly emerging bale is supported on plate 20 until it is completely free of the bale case following which the bale rolls off the side of the bale chute instead of sliding off the rear of the chute.

A chain brace 32 is shown in FIG. 1 and diagrammatically indicated by a broken line in FIG. 2. The chain 32 is attached to the upturned flange 26 of the bale chute by a pivot bolt 34. The other end of the chain 32 is selectively and removably connected to a bracket 35 pivotally mounted at 36 to the side wall 11 of the bale case. The bracket 35 is provided with the usual key hole slots 38 commonly employed in such connections.

A circular friction brake disc 39 is mounted on the bale chute pivotal mounting bolt 16. The brake disc 39 has a central aperture (no reference numeral) through which the bolt 16 passes. As is shown in FIGS. 2 and 3, the brake disc 39 is attached by welds 40 to the end of the bale chute main cross member 31. This fixes the disc relative to the bale chute whereby any pivotal movement of the bale chute about the pivot members 16 and 18 is accompanied by identical pivotal movement of the brake disc 39 about pivot member 16.

Referring primarily to FIG. 3, a pair of fiber friction pads, respectively identified by the reference numerals 41 and 42, bear against opposite sides of brake disc 39. The friction pads 41 and 42 are respectively attached by rivets 44 to mounting plates 45 and 46. The friction pads are disposed along one edge of the mounting plates to which they are riveted while each of the mounting plates has a portion projecting along the bale case beyond the area covered by the friction pads. The mounting plate 45 is simply a flat plate disposed flatly against bale case side wall 10. The mounting plate 46 has a flange portion 48 (FIG. 3) projecting toward plate 45 and resting thereagainst. The point of engagement of flange 48 on plate 45 acts as a fulcrum about which the plate 46 and its friction pad 42 are free to move toward and away from the friction pad 41. As may be seen in FIG. 3, the extent of projection of flange 48 from plate 46 is equal to the combined thickness of both friction pads 41 and 42 plus the thickness of brake disc 39. A pair of bolts 50 extend through apertures (not numbered) in bale case side wall 10 and in the portions of friction pad mounting plates 45 and 46 projecting beyond the friction pads 41 and 42. The bolts 50 are disposed between the friction pads and the fulcrum provided by flange 48. Springs 51 are carried on each of the bolts 50 and maintained in compression between friction pad mounting plate 46 and the nuts 52 on the outboard end of bolts 50. The bolts 50 serve to fix the friction pads against bale case side wall 10 and prevent relative movement between the friction pads and the bale case side wall about the pivot axis of the bale chute. The tension of springs 51 can be selectively increased or decreased by manipulation of nuts 52 to maintain the desired degree of frictional drag between the pads 41 and 42 and brake disc 39.

With this inexpensive friction brake device, the bale chute will remain in any angular position to which it is manually moved. The chain brace 32 need not be reset from the operative position during transport of the baler. The friction device eliminates bouncing of the bale chute and therefore drastically reduces the loading and wear at the bale chute pivot bolts 16 and 18 and at the chain connection point 34 and bracket connection point 36.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. The combination of a hay baler bale case having an open discharge end, a bale chute disposed at the discharge end of said bale case and having an operative position extending outwardly from the bale case to support bales of hay or the like as they emerge from the bale case when the hay baler is operating pivot means mounting said chute on said bale case for vertical pivotal movement between said operative position and a generally vertical transport position, and brace means extending between said bale case and said chute to support the weight of said chute and bales thereon in said operative position, wherein the improvement comprises a friction device having at least two interengaging relatively movable elements, one of said elements being fixed to said chute adjacent said bale case for movement with the chute about said pivot means, and means attaching another of said elements to said bale case in position to frictionally bear against said one element to hold said chute in any given position.

2. The combination of a hay baler bale case having vertical side walls, a horizontal bottom and an open discharge end through which bales of hay or the like emerge when the baler is operating, an elongated bale chute disposed at said discharge end of said bale case and forming an extension of said bottom beyond said bale case side walls, said chute supporting emerging bales until they are free of the bale case, pivot members attaching one end of said chute to the respective side walls of said bale case for vertical pivotal movement of said chute relative to said bale case between a generally horizontal operative position and a generally vertical transport position, and brace means extending between said bale case and said chute and preventing downward pivoting of said chute beyond said operative position, wherein the improvement comprises a planar member fixedly attached to said chute adjacent said bale case for pivotal movement about said pivot members relative to said bale case along with said chute, a first friction pad disposed along one side wall of said bale case and bearing against one side of said planar member, a second friction pad bearing against the other side of said planar member opposite said first friction pad, means fixing said first and second friction pads on a side wall of said bale case against movement relative thereto about said pivot members, and resilient means urging said first and second friction pads toward each other to frictionally grip said planar member therebetween and hold said chute in any desired position to which it is manually moved.

3. The combination recited in claim 2 wherein said friction pads are respectively mounted on plates disposed parallel to said side walls of said bale case, said pads each being disposed along one edge of their respective mounting plates, said plates having portions projecting along said bale case side walls beyond said pads, one of said plates having a flange portion projecting therefrom toward the other of said plates a distance at least equal to the combined thickness of said first and second friction pads plus the thickness of said planar member, said flange portion bearing against the other of said plates and constituting a fulcrum about which at least one of said friction pads is movable toward and away from the other friction pad.

4. The combination recited in claim 3 wherein a bolt extends through one side wall of said bale case and both said friction pad mounting plates, said bolt passing through said plates between said friction pads and said fulcrum, and a spring carried by said bolt and urging one of said mounting plates toward the other mounting plate and simultaneously urging the other mounting plate against said one side wall of said bale case.

5. The combination recited in claim 2 wherein said planar member comprises a friction brake disc having a central mounting aperture, one of said bale chute pivot members extending through said brake disc mounting aperture, and means fixedly attaching a portion of said disc spaced from said mounting aperture to said bale chute to prevent relative movement between said disc and said chute.

References Cited

UNITED STATES PATENTS

| | | | |
|---|---|---|---|
| 2,529,842 | 11/1950 | Jones et al. | 193—5 |
| 2,625,002 | 1/1953 | Prechel. | |
| 2,947,400 | 8/1960 | Murray et al. | 193—5 |
| 3,126,069 | 3/1964 | Shepley. | |
| 3,243,028 | 3/1966 | Tufts | 193—9 |

BILLY J. WILHITE, *Primary Examiner.*